United States Patent [19]

Oran et al.

[11] Patent Number: 5,617,526
[45] Date of Patent: Apr. 1, 1997

[54] OPERATING SYSTEM PROVIDED NOTIFICATION AREA FOR DISPLAYING VISUAL NOTIFICATIONS FROM APPLICATION PROGRAMS

[75] Inventors: Daniel P. Oran, Cambridge, Mass.; Teresa A. Serrador, Kirkland, Wash.; Joseph D. Belfiore; George H. Pitt, III, both of Redmond, Wash.

[73] Assignee: Microsoft Corporation, Redmond, Wash.

[21] Appl. No.: 355,398

[22] Filed: Dec. 13, 1994

[51] Int. Cl.$^6$ ........................................... G06F 3/00
[52] U.S. Cl. ................................. 395/326; 395/348
[58] Field of Search ............................ 395/155, 159, 395/161

[56] References Cited

U.S. PATENT DOCUMENTS

| | | | |
|---|---|---|---|
| 4,713,656 | 12/1987 | Cliff et al. | 340/723 |
| 5,237,653 | 8/1993 | Noguchi et al. | 395/158 |
| 5,261,044 | 11/1993 | Dev et al. | 395/159 |
| 5,333,256 | 7/1994 | Green et al. | 395/159 |
| 5,371,848 | 12/1994 | Casey et al. | 395/161 |
| 5,375,199 | 12/1994 | Harrow et al. | 395/159 |
| 5,471,399 | 11/1995 | Tanaka et al. | 395/161 X |
| 5,483,631 | 1/1996 | Nagai et al. | 395/155 |

OTHER PUBLICATIONS

Cowart, R., "Mastering Windows 3.1," Sybex Publ., 1992, p. 909.
McClelland, Deke, *Macintosh® System 7.1:Everything You Need To Know,* Sybex Inc., San Francisco, Calif., 1992, pp. 37–38, 228.
Knowledge Base Article describing Microsoft Mail 3.0 from Microsoft Development Network, 1994.

*Primary Examiner*—Raymond J. Bayerl
*Assistant Examiner*—A. Katbab
*Attorney, Agent, or Firm*—Seed and Berry LLP

[57] ABSTRACT

A system visual notification area is provided to display visual notifications to a user. The visual notifications provide visual cues to a user of the nature of the intended notification. The visual notifications may notify a user of events, status information, or other information. The visual notifications may be interactive so as to display information about a notification when a cursor is positioned to point at the notification. Moreover, the visual notifications may be interactive so as to provide a means for activating a program or displaying a menu to respond to the notification. The visual notifications are displayed without substantially interrupting execution of any currently active programs. Furthermore, the visual notifications may be displayed without the program that is provided to respond to the notifications having a currently active window.

41 Claims, 8 Drawing Sheets

OPERATING SYSTEM PROVIDED NOTIFICATION AREA FOR DISPLAYING VISUAL NOTIFICATIONS FROM APPLICATION PROGRAMS

TECHNICAL FIELD

The present invention relates generally to data processing systems and, more particularly, to notification of status information and events in a data processing system.

BACKGROUND OF THE INVENTION

Users of conventional operating systems are often uninformed of events outside of the currently active program. For example, in many conventional operating systems, it is difficult for a user to be informed that an electronic mail message has arrived. Systems that do provide some form of notification, such as a notification of the arrival of an electronic mail message, generally require that the associated program (i.e., the mail program) be visible and running in order for the notifications to arrive. It has also been difficult for users to obtain status information regarding resources in the computer system. For example, it is often difficult for users of portable computers to know whether the batteries in their portable computers need to be recharged and will soon be out of power.

SUMMARY OF THE INVENTION

The above-described difficulties encountered with conventional systems are overcome by the present invention by providing a system-wide visual notification area. In accordance with a first aspect of the present invention, a method is practiced on a computer system that has an output device and that runs an operating system. The operating system provides a graphical user interface on the output device. A portion of the graphical user interface is designated as a notification area for displaying notifications. Each notification includes a graphical object. A system tool is provided in the computer system to display a notification in the notification area. An application program is run on the computer system, and the notification is displayed in the notification area using the system tool, without substantially interrupting the running of the application program.

In accordance with another aspect of the present invention, a first program is run on a computer system that provides a user interface on the output device. An application program is also run on the computer system. A system tool is provided that designates a portion of the user interface as a notification area that is reserved for displaying visual notifications to a user. A third program is also run on the computer system. This third program provides a request to display a selected visual notification in the notification area. In response to the request, the selected visual notification is displayed in the notification area using the system tool without substantially interrupting the running of the second program.

In accordance with yet another aspect of the present invention, a computer system includes an output device and a processor for running programs. The processor runs an application program and an operating system. The operating system displays a graphical user interface on the output device. The processor also runs a system tool that displays visual notifications for a user in a designated notification area on the graphical user interface. The system tool displays the visual notifications without substantially interrupting the running of the application program on the user interface.

BRIEF DESCRIPTION OF THE DRAWINGS

A preferred embodiment of the present invention will be described below with reference to the following figures.

DETAILED DESCRIPTION OF THE INVENTION

The preferred embodiment of the present invention provides a taskbar notification area at a predefined location on a user interface wherein icons may be displayed to inform a user of status information and events. This dedicated taskbar notification area is always visible and cannot be readily obscured by visible non-minimized windows and the like. The icons are placed within the taskbar notification area without disrupting work flow of a user and may be placed in the taskbar notification area without the need for an associated program that requests the notifications having a correctly active window. The icons displayed within the taskbar notification area may be interactive in that tool tip information may be provided in response to the user pointing at the icon with the mouse and the application may perform activities, such as the opening of an application window, in response to the user using the mouse to double-click on the icon.

Figure 1:
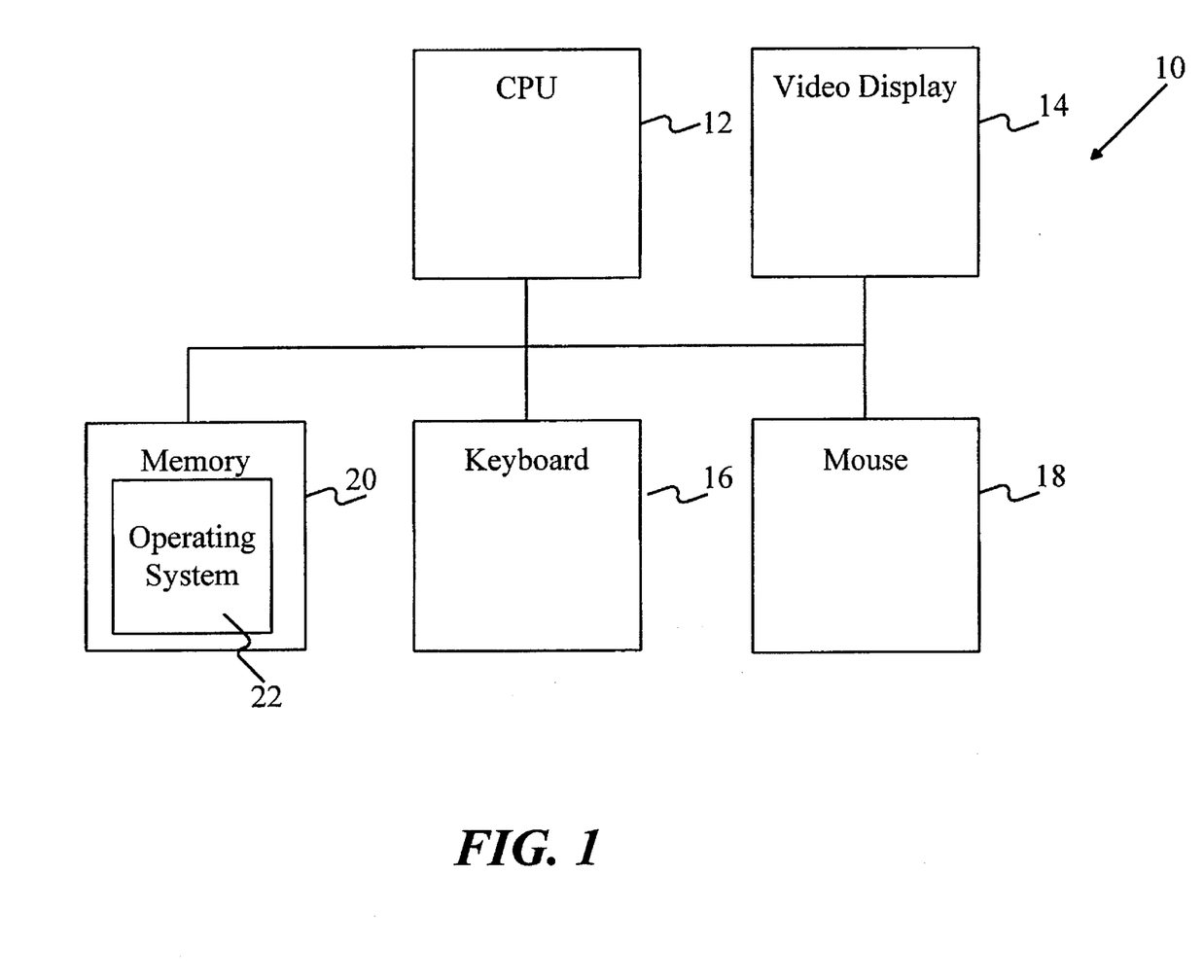
FIG. 1 is a block diagram of a computer system that is suitable for practicing the preferred embodiment to the present invention.

FIG. 1 is a block diagram of a computer system 10 that is suitable for practicing the preferred embodiment of the present invention. The computer system 10 includes a central processing unit (CPU) 12 that is coupled to a number of peripheral devices. The peripheral devices include a video display 14, a keyboard 16, and a mouse 18. The CPU 12 is also connected to a memory 20 that holds a copy of an operating system 22.

In the preferred embodiment of the present invention, the taskbar notification area is provided as part of the shell of the operating system 22. As such, the code for implementing the taskbar notification area is included within the operating system 22. Although the preferred embodiment of the present invention will be described with reference to an implementation wherein the taskbar notification area is implemented as part of the operating system 22, those skilled in the art will recognize that the taskbar notification area may be implemented as part of an application program or as a separate system resource that interacts with the operating system 22. Those skilled in the art will also appreciate that the present invention may be practiced in computer system configurations that differ from that shown in FIG. 1. The computer system of FIG. 1 is intended to be merely illustrative.

For purposes of the discussion below, it will be assumed that the operating system 22 is the "WINDOWS" 95 operating system from Microsoft Corporation of Redmond, Wash. Those skilled in the art will appreciate that the present invention may also be practiced with other operating systems.

Figure 2:
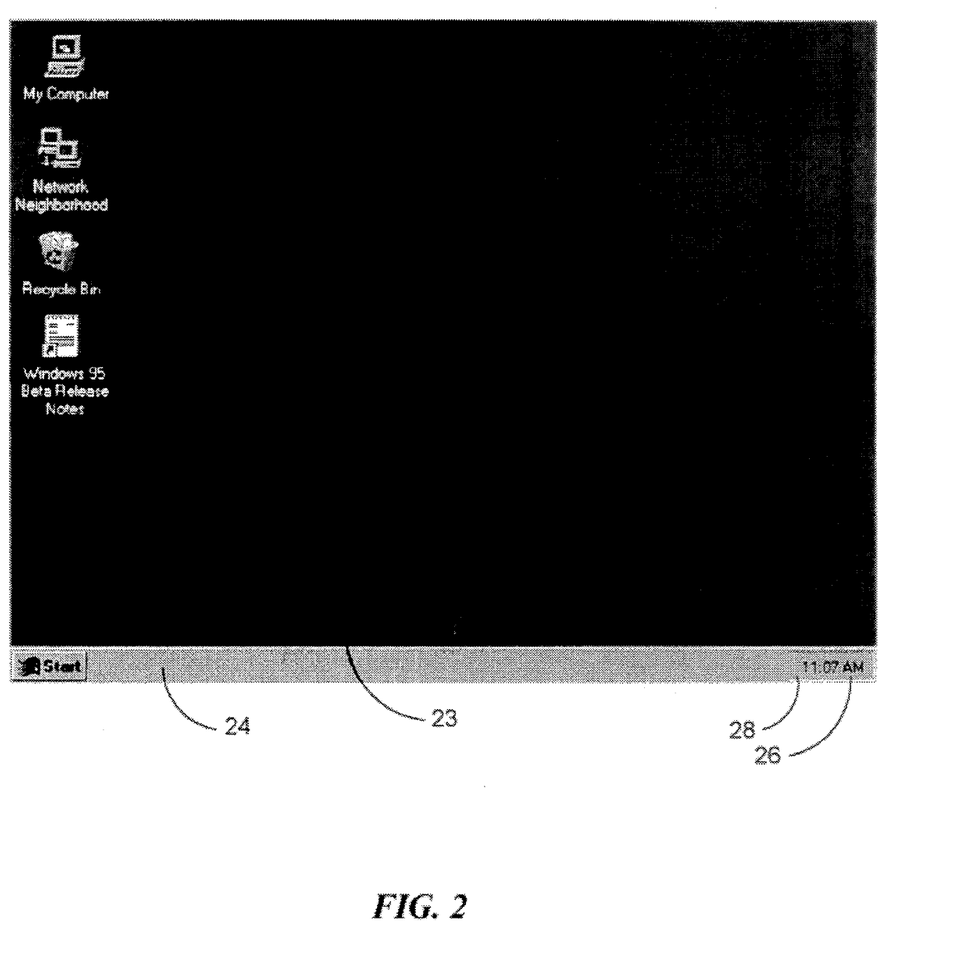
FIG. 2 is an example showing a virtual desktop and taskbar notification area in accordance with the preferred embodiment to the present invention.
Figure 5:
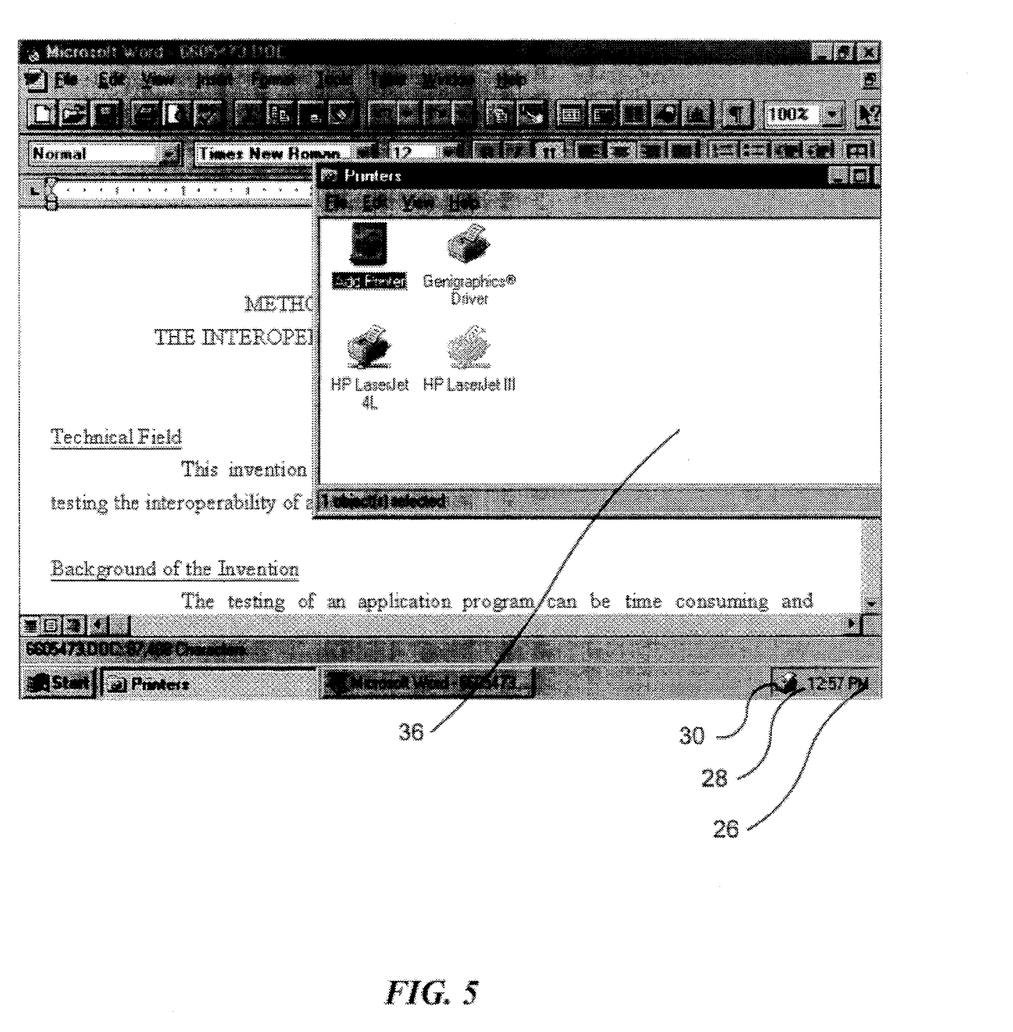
FIG. 5 shows an example of a window being opened in response to double-clicking a mouse on an icon in the taskbar notification area per the preferred embodiment of the present invention.

FIG. 2 depicts an example of the user interface that is displayed by shell of the operating system 22. The user interface includes a virtual desktop 23 with a taskbar 24 located at the bottom of the virtual desktop. The taskbar 24 is like that described in co-pending patent application entitled "Taskbar and Start Menu," Ser. No. 08/478,490, which is assigned to a common assignee with the present application and which was filed on even date herewith. The taskbar 24 includes a dedicated area 26 for showing a clock. In the example in FIG. 2 the clock displays a time of 6:54 PM. Directly adjacent to the clock area 26 is the taskbar notification area 28. In FIG. 5 the taskbar notification area is shown as being to the left of the clock. Nevertheless, it should be appreciated that the taskbar notification area may appear at other locations relative to the clock. In the example shown in FIG. 2, no icon is currently displayed within the taskbar notification area 28. As will be described in more detail below, the size of the taskbar notification area 28 increases to accommodate the space requirements needed to display icons and shrinks to conserve space when space requirements for displaying the icons decreases.

Figure 3:
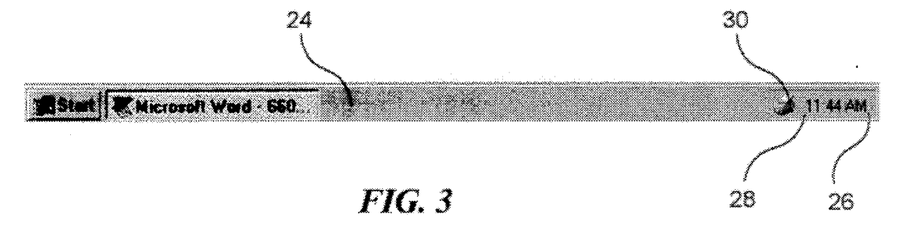
FIG. 3 shows an example of an icon being displayed in the taskbar notification area in the preferred embodiment of the present invention.

In order to fully appreciate the operation of the taskbar notification area 28 in the preferred embodiment of the present invention, it is helpful to consider an example wherein the taskbar notification area is used. Suppose that a user wishes to print a word processing document. When the user begins to print the word processing document, the taskbar notification area 28 appears as shown in FIG. 3. In particular, a printer icon 30 is displayed within the taskbar notification area 28. The printer icon 30 is displayed without substantially interrupting the execution of the currently active application. The taskbar notification area 28 has been expanded from its previous size (shown in FIG. 2) to accommodate the display of the printer icon 30. The printer icon 30 advises a user that at least one document is currently being printed. The printer icon 30 provides a visual cue that indicates the nature of the notification.

Those skilled in the art will appreciate that the present invention is not limited to displaying icons in the taskbar notification area, rather any type of graphical object or visual notification may be displayed in the taskbar notification area. Moreover, these notifications may be accompanied by sound notifications, such as a chime.

Figure 4:
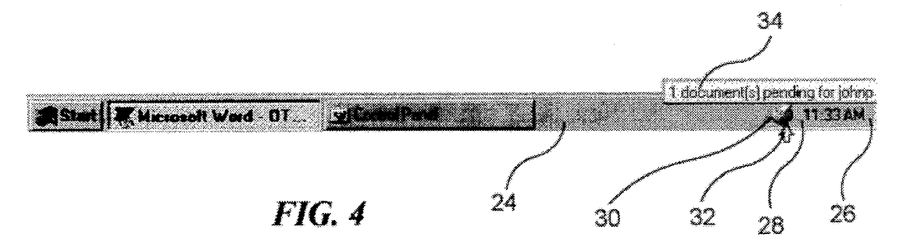
FIG. 4 shows an example of a tool tip being generated for an icon in the taskbar notification area in accordance with the preferred embodiment of the present invention.

If the user uses mouse 18 to position a mouse cursor 32 to point at the printer icon 30 within the taskbar notification area 28, a tool tip 34 will be displayed as shown in FIG. 4. The tool tip 34 is displayed solely in response to the mouse cursor 32 being positioned to point at the printer icon 30. In the example shown in FIG. 4, the tool tip indicates the number of documents that are currently pending on the printer for the user. The tool tip that is displayed is like that described in co-pending patent application entitled "Timing and Velocity Control for Displaying Graphical Information," Ser. No. 08/260,558, filed on Jun. 16, 1994, and assigned to a common assignee with the present application. The nature of the information provided by the tool tip depends upon the icon shown within the taskbar notification area. In general, the tool tip provides information about the notification. The tool tip 34 provides a first level of interactivity for the icons in the taskbar notification area 28.

A second level of interactivity for the icons in the taskbar notification area is provided when the mouse cursor 32 is positioned to point at an icon 30 within the taskbar notification area 28, and then the user double-clicks a designated one of the mouse buttons. The application program associated with the icon receives a message that the user has double-clicked on the icon and then determines what actions to take in response to the double-clicking. In the case of the printer icon 30, the print manager is the application that receives the double-click message and, in response, it opens the print manager window 36. More generally, in the preferred embodiment the associated application provides code for notifying an application associated with an icon in the taskbar notification area 28 of activities that are performed relative to the icon. These activities may include events like single clicking on the icon, double-clicking on the icon or the mouse cursor being positioned to point at the icon. The application associated with the icon receives this message and determines what activities to perform.

Figure 6:
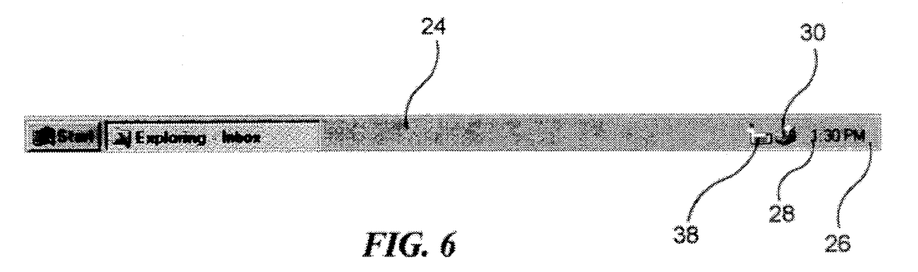
FIG. 6 shows an example of a taskbar notification area displaying multiple icons simultaneously in accordance with the preferred embodiment of the present invention.

The taskbar notification area 28 is not a static area. It grows and shrinks to accommodate the number of icons that are currently displayed within it. The taskbar notification area 28 is a window that may be resized and relocated. For example, as shown in FIG. 6, the taskbar notification area 28 has been expanded from its size in FIG. 3 to accommodate the display of both printer icon 30 and mail icon 38. The mail icon 38 indicates that an electronic mail message has arrived for a user. Further suppose the user then looks at the electronic mail message. In such a case, the taskbar notification area 28 shrinks in size to display only the printer icon 30 as shown in FIG. 5.

The above examples have related to instances wherein the notifications notify a user of events. It should also be appreciated that the notifications may convey status information, such as the status of a modem or the status of a user's batteries in a portable computer.

The above discussion has focused on the description of the present invention from the user's perspective. The discussion below will now focus on the implementation of the preferred embodiment of the present invention at a code level.

Figure 7:
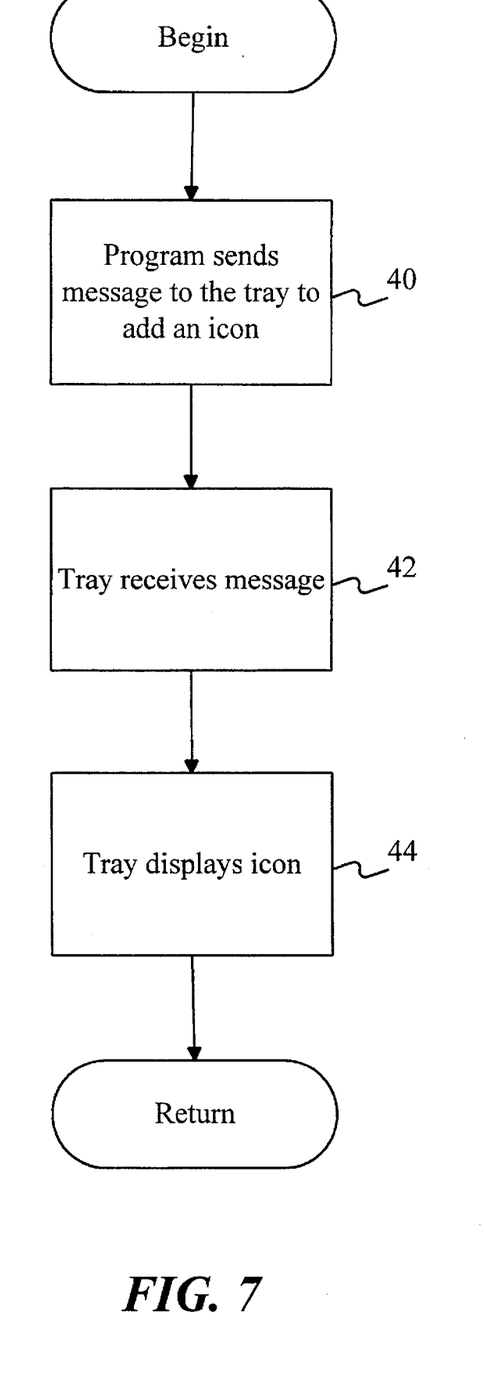
FIG. 7 is a flow chart illustrating the steps that are performed to display an icon in the taskbar notification area in accordance with the preferred embodiment to the present invention.

FIG. 7 shows a flowchart of the steps that are performed in order to display an icon within the taskbar notification area 28. Initially, an application program sends a message to a process run within the operating system, known as the taskbar, which is responsible for displaying and managing the taskbar 24. The taskbar's responsibilities also include displaying and managing the taskbar notification area 28.

The application program sends the message by calling the Shell_NotifyIcon() function as defined by the "WINDOWS" 95 operating system. This function sends a message to the taskbar that includes several parameters. A first of the parameters of the message identifies whether a user wishes to add an icon, modify an icon, or delete an icon from the taskbar notification area 28. In the present example, the message indicates that the user wishes to add an icon to the taskbar notification area. A second parameter passed in the message specifies the size of the information that follows the parameter. A third parameter is a value for a window handle to the application program window that is sending the message. The window handle is a numerical identifier that uniquely identifies the window.

A fourth parameter passed in this message is the unique identifier that is application specific. A single application may have multiple unique identifiers associated with it. The interpretation of these identifiers is at the discretion of the application. Additional parameters passed in the message include flags that identify whether fields in the message that follow the flags parameter are valid or not. A callback message identifier parameter is passed as part of the message. The callback message identifier is an integer that uniquely identifies a message as a callback message. This callback message identifier is used by the taskbar to send callback messages to the target application window. The two final parameters passed in the message are a handle to the icon to show in the taskbar notification area and a string that serves as a tool tip message.

The taskbar receives the message that encapsulates the parameters discussed above (step 42 in FIG. 7). The taskbar then uses the handle for the icon that was passed as part of the message from the application program to retrieve and display the icon within the taskbar notification area 28 without substantially interrupting the execution of the active application (step 44).

Consider an example wherein a mail program wishes to advise the taskbar that it has received a new electronic mail message. In such a case, the mail program sends a message to the taskbar asking the taskbar to add an icon that displays a single envelope within a mail slot. The handle to the icon showing the single envelope in the mail slot is passed as part of the message that is sent to the taskbar. The taskbar then uses the handle provided by the mail program to display the icon in the taskbar notification area 28.

Figure 8:
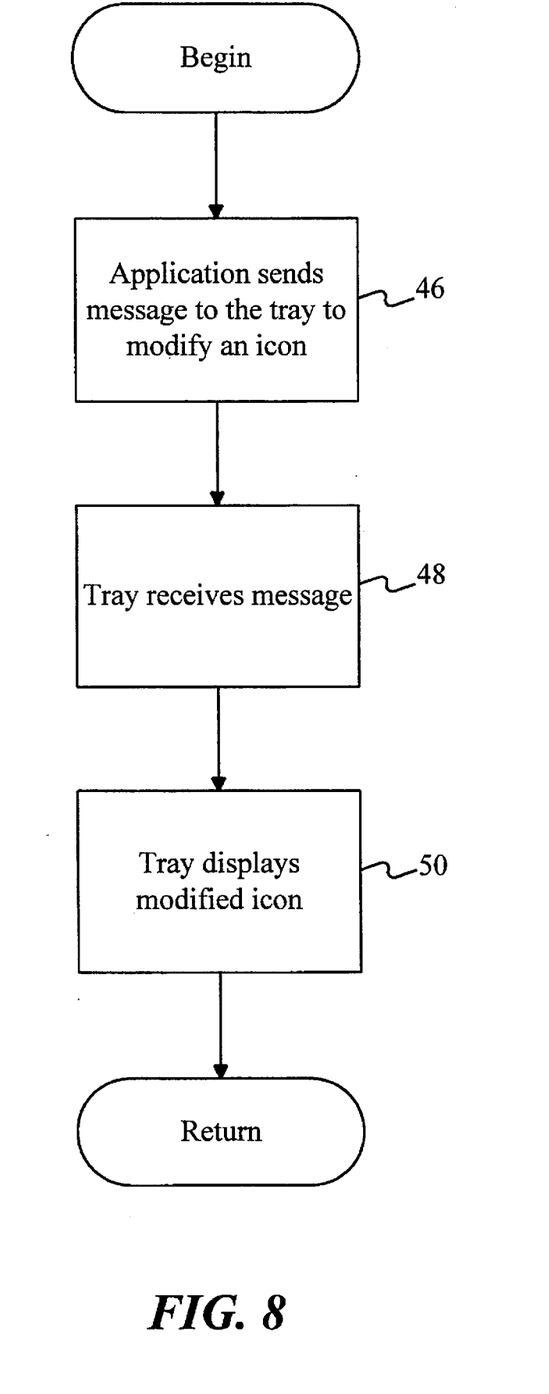
FIG. 8 is a flow chart illustrating the steps that are performed to modify an icon that is currently displayed in the taskbar notification area per the preferred embodiment to the present invention.

The steps that are performed when an application program wishes to modify the icon shown within the taskbar notification area 28 are shown in FIG. 8. The application initially sends a message to the taskbar that specifies it wishes to modify an icon (step 46). For example, suppose that the mail program wishes to change the icon to one that displays a mail slot with multiple envelopes to indicate that the user has now received multiple electronic mail messages. In such a case, the mail program sends a message to the taskbar indicating that it wishes to modify the icon and passes the handle to the new icon to be displayed. The taskbar receives the message (step 48), and the taskbar retrieves the modified icon and displays it in the taskbar notification area 28 (step 50).

Figure 9:
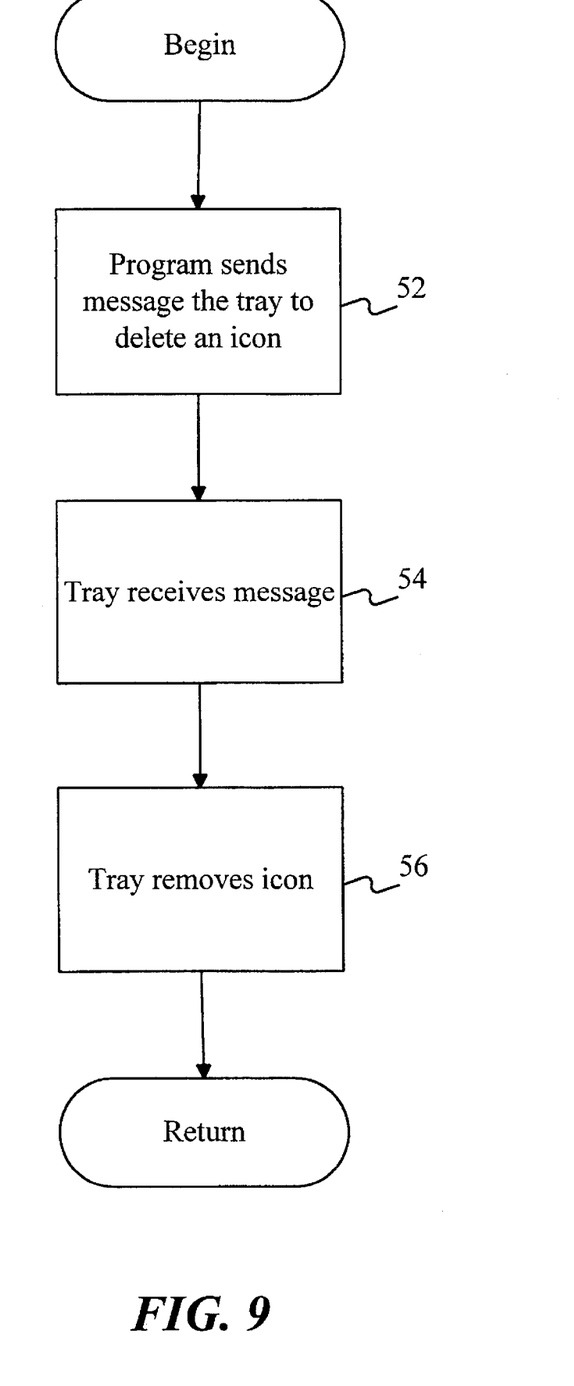
FIG. 9 is a flow chart illustrating the steps that are performed to delete an icon that is currently displayed in a taskbar notification area in accordance with the preferred embodiment of the present invention.

The deletion of icons in the taskbar notification area 28 is handled in a similar fashion. As shown in FIG. 9, an application program sends a message to the taskbar to delete an icon using the Shell_NotifyIcon() function as described above (step 52). Suppose that a print job is done and the print manager wishes to remove the printer icon 30 (FIG. 5) from the taskbar notification area 28. In such a case, the print manager sends a message to the taskbar to delete the printer icon 30. The taskbar receives the message (step 54), and then, the taskbar removes the icon so that it is no longer displayed in the taskbar notification area (step 56). In the example case of the printer icon 30, the taskbar receives a message from the print manager and removes the printer icon from the taskbar notification area 28.

Figure 10:
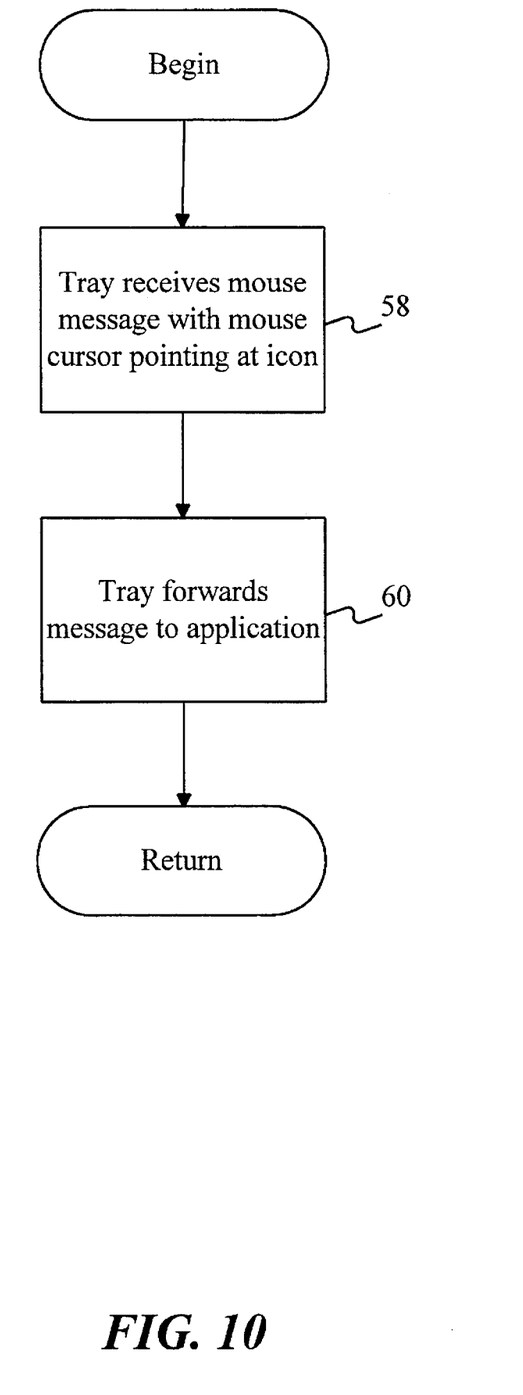
FIG. 10 is a flow chart illustrating the steps that are performed to notify application programs of mouse activities relative to an icon in the taskbar notification area per the preferred embodiment to the present invention.

The notification area is part of the taskbar 24, which constitutes a separate window. The taskbar receives mouse messages when the mouse cursor is positioned over the taskbar window, including the taskbar notification area. The taskbar is responsible for notifying the application associated with icons in the taskbar notification area 28 of mouse activities. Thus, when the mouse cursor is positioned to point at one of the icons displayed within the taskbar notification area 28, the taskbar performs the steps shown in FIG. 10. In particular, the taskbar receives a mouse message that specifies the coordinates of the mouse cursor and processes these coordinates to determine that the mouse cursor is currently pointing at one of the icons shown within the taskbar notification area 28 (step 58) in FIG. 10. The taskbar then sends a callback message to the application program associated with the icon to inform the application of the mouse activity. In particular, the taskbar may forward messages that were originally sent to the taskbar notification area. In this regard, the taskbar acts as a parent window. Thus, an application program may be informed of current mouse coordinates, whether the left, middle, or right button on the mouse is depressed or up, whether the mouse has moved, whether one of the mouse buttons has been clicked, and whether a double-click of one of the mouse buttons has occurred. Using this mechanism, the taskbar advises an application program of when an icon has been double-clicked on and the icon then decides what activities to perform (e.g., opening the application window).

Those skilled in the art will appreciate that the icons displayed within the figures in the above description are not intended to be exhaustive of the icons that may be displayed within the taskbar notification area. Moreover, those skilled in the art will appreciate that the examples given above are intended to be merely illustrative and that other behaviors may be practiced by application programs.

While the present invention has been described with reference to a preferred embodiment thereof, those skilled in the art will appreciate that various changes in form and detail may be made without departing from the intended scope of the invention as defined in the appended claims.

We claim:

1. In a computer system having an output device and running an operating system having a shell that provides a shell graphical user interface on the output device, a method comprising the steps of:

designating a portion of the shell graphical user interface as a notification area for displaying notifications, each said notification including a graphical object;

running a first application program on the computer system; and displaying a notification from a second application in the notification area with the shell, without substantially interrupting the running of the first application program.

2. The method of claim 1 wherein the graphical object included in the notification is an icon and wherein the step of displaying the notification comprises the step of displaying the icon without substantially interrupting the running of the first application program.

3. The method of claim 1 wherein the step of displaying the notification comprises the step of displaying a notification in the notification area using the system without substantially interrupting the running of the first application program to notify a user of an event.

4. The method of claim 1 wherein the step of displaying the notification comprises the step of displaying a notification in the notification area using the system without substantially interrupting the running of the first application program to convey status information to a user.

5. The method of claim 1, further comprising the step of displaying a second notification in the notification area from a third application program using the system tool without interrupting the running of the first application program such that the second notification is displayed in the notification area along with the first notification that is already displayed.

6. The method of claim 1 wherein the computer system further comprises an input device for manipulating a cursor on the output device in response to user actions and wherein the method further comprises the step of displaying information about the notification solely in response to the cursor pointing at the notification.

7. The method of claim 1 wherein the computer system further comprises an input device for use by a user and wherein the method further comprises the step of activating a program to respond to the notification in response to the user using the input device to perform activities on the notification.

8. The method of claim 7 wherein the input device is a mouse and the activities are double-clicking with the mouse on the notification.

9. The method of claim 1, further comprising the step of removing the notification from the notification area when the notification is no longer required.

10. The method of claim 1 wherein the system tool is part of the operating system.

11. In a computer system having an operating system and an output device, a method comprising the steps of:

running a first program on the computer system that provides a taskbar on the output device and a second program that is an application program, said taskbar by said operating system;

designating a portion of the taskbar as a notification area that is reserved for displaying visual notifications to a user;

running a third program on the computer system that provides a request to display a selected visual notification in the notification area; and in response to the request, displaying the selected visual notification in the notification area by said operating system without substantially interrupting the running of the second program.

12. The method of claim 11 wherein the first program is an operating system and the step of running the first program comprises the step of running the operating system on the computer system.

13. The method of claim 12 wherein the system tool is provided by the operating system.

14. The method of claim 13 wherein the step of using the system resource to display the second visual notification further comprises the step of expanding the notification area to facilitate displaying the second visual notification along with the selected visual notification.

15. The method of claim 11, further comprising the steps of:

running a fourth program on the computer system that provides a request to display a second visual notification in the notification area;

in response to the request from the fourth program, using the system resource to display the second visual notification along with the selected visual notification in the notification area without substantially interrupting the running of the second program.

16. The method of claim 11 wherein the computer system further comprises an input device that a user may use to manipulate a cursor on the output device and wherein the method further comprises the step of displaying information about the selected visual notification solely in response to the cursor pointing at the selected visual notification in the notification area.

17. The method of claim 11 wherein the selected visual notification provides a user with a visual cue about a nature of the notification.

18. The method of claim 11 wherein the selected visual notification is an icon and the step of displaying the selected visual notification comprises the step of displaying the icon in the notification area.

19. The method of claim 11 wherein the step of running the third program on the computer system is performed without displaying an active window for the third program on the output device.

20. The method of claim 11 wherein the computer system further comprises an input device that the user may use to perform activities on the selected visual notification and in response to the user using the input device to perform activities on the selected icon, opening an active window on the output device for the third program.

21. The method of claim 11, further comprising the step of displaying additional visual notifications in the notification area using the system tool wherein each additional visual notification is unique and each additional visual notification provides a visual cue of a nature of the notification.

22. The method of claim 11 wherein the selected visual notification notifies the user of an event.

23. The method of claim 11 wherein the selected visual notification conveys status information to the user.

24. In a computer system having an output device and running an operating system and a first application program, a method comprising the computer-implemented steps of:

displaying a taskbar by the operating system on the output device;

designating a portion of the taskbar as a notification area for displaying notifications wherein each said notification includes a graphical object; and displaying a first notification in the notification area at a request of the first application program.

25. The method of claim 24 wherein the computer system runs a second application program and wherein the method further comprises the step of displaying a second notification concurrently with the first notification in the notification area in response to a request by the second application program.

26. The method of claim 24, further comprising the step of displaying an additional notification in the notification area so that both the first notification and the additional notification are displayed in the notification area in response to a request by the first application program and the first notification differs from the additional notification.

27. The method of claim 24 wherein the computer system includes a second application program that does not currently have a non-closed window and wherein the method further comprises the step of displaying a second notification in the notification area in response to a request by the second application program.

28. The method of claim 24 wherein the first application program provides the graphical object of the first notification to the operating system for display in the notification area.

29. In a computer system having an output device and running an operating system having a shell that provides a shell graphical user interface on the output device, a computer-readable storage medium holding instructions for performing a method comprising the steps of:

designating a portion of the shell graphical user interface as a notification area for displaying notifications, each said notification including a graphical object;

running a first application program on the computer system; and displaying a notification from a second application in the notification area with the shell without substantially interrupting the running of the first application program.

30. The computer-readable storage medium of claim 29 wherein the graphical object included in the notification is an icon and wherein the step of displaying the notification comprises the step of displaying the icon without substantially interrupting the running of the first application program.

31. The computer-readable storage medium of claim 29 wherein the step of displaying the notification comprises the step of displaying a notification in the notification area using the system without substantially interrupting the running of the first application program to notify a user of an event.

32. The computer-readable storage medium of claim 29 wherein the step of displaying the notification comprises the step of displaying a notification in the notification area using the system without substantially interrupting the running of the first application program to convey status information to a user.

33. In a computer system having an operating system and an output device, a computer-readable storage medium holding instructions for performing a method comprising the steps of:

running a first program on the computer system that provides a taskbar on the output device and a second program that is an application program, said taskbar by said operating system;

designates a portion of the taskbar as a notification area that is reserved for displaying visual notifications to a user;

running a third program on the computer system that provides a request to display a selected visual notification in the notification area; and in response to the request, displaying the selected visual notification in the notification area by said operating tool without substantially interrupting the running of the second program.

34. The computer-readable storage medium of claim 33 wherein the first program is an operating system and the step of running the first program comprises the step of running the operating system on the computer system.

35. The computer-readable storage medium of claim 34 wherein the method further comprises the steps of:

running a fourth program on the computer system that provides a request to display a second visual notification in the notification area; and in response to the request from the fourth program, using the system resource to display the second visual notification along with the selected visual notification in the notification area without substantially interrupting the running of the second program.

36. The computer-readable storage medium of claim 35 wherein the step of using the system resource to display the second visual notification further comprises the step of expanding the notification area to facilitate displaying the second visual notification along with the selected visual notification.

37. In a computer system having an output device and running an operating system and a first application program, a computer-readable storage medium holding instructions for performing a method comprising the computer-implemented steps of:

displaying a taskbar by the operating system on the output device;

designating a portion of the taskbar as a notification area for displaying notifications wherein each said notification includes a graphical object; and displaying a first notification in the notification area at a request of the first application program.

38. The computer-readable storage medium of claim 37 wherein the computer system runs a second application program and wherein the method further comprises the step of displaying a second notification concurrently with the first notification in the notification area in response to a request by the second application program.

39. The computer-readable storage medium of claim 37, further comprising the step of displaying an additional notification in the notification area so that both the first notification and the additional notification are displayed in the notification area in response to a request by the first application program and the first notification differs from the additional notification.

40. The computer-readable storage medium of claim 37 wherein the computer system includes a second application program that does not currently have a non-closed window and wherein the method further comprises the step of displaying a second notification in the notification area in response to a request by the second application program.

41. The computer-readable storage medium of claim 37 wherein the first application program provides the graphical object of the first notification to the operating system for display in the notification area.

* * * * *